UNITED STATES PATENT OFFICE 2,627,526

PREPARATION OF UNSYMMETRICAL SECONDARY AMINES

Paul L. Du Brow, Chicago, and James Harwood, Western Springs, Ill., assignors to Armour and Company, Chicago, Ill., a corporation of Illinois No Drawing. Application September 7, 1949, Serial No. 114,457

8 Claims. (Cl. 260—583)

This invention relates to the preparation of unsymmetrical secondary amines.

We have developed a new procedure for preparing aliphatic unsymmetrical secondary amines. Our method is relatively simple and results in a high yield of the product which is not contaminated with the primary and tertiary amines. The procedure is essentially as follows:

An unsymmetrical secondary amine is a substituted ammonia in which two of the hydrogen atoms formerly attached to the nitrogen have been replaced by dissimilar radicals. For example, one of the groups may consist of an alkyl radical like methyl, ethyl or propyl, whereas the other may be a long chain alkyl radical like octyl, decyl, dodecyl, octadecyl, etc. It is also possible to make substitutions with alicyclic or aromatic radicals. Structurally speaking, such compounds may be indicated in the following manner:

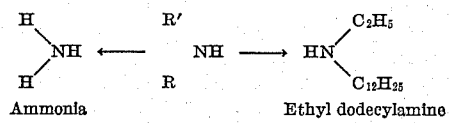

Ammonia        Ethyl dodecylamine

The physical and chemical properties of unsymmetrical amines are usually associated with the general properties exhibited by the type of radicals attached. If radicals containing highly polar groups are attached to the nitrogen, the unsymmetrical amine will likely be water soluble. Water insoluble radicals will, accordingly, render the amine water insoluble. These characteristics of unsymmetrical amines make them valuable not only as compounds in themselves but as intermediates for making other compounds.

Although these compounds are not available on a commercial scale, unsymmetrical amines would be easily distributed in the form of amine salts such as the hydrochloride, acetate or sulfate. Such amine salts are immediately important as wetting, emulsifying and dispersing agents. Other notable uses of amine salts would be as fungicides, bactericides, rodenticides, insecticides, froth flotation reagents, plasticizers, etc. These latter uses would involve substituted amines having a carbon chain length of 4 to 18 carbon atoms.

As intermediates, secondary amines have found wide use. Insofar as a secondary amine has a replaceable hydrogen atom, it is possible to replace it with many other groups and thereby form an entirely new compound.

For example, if the available hydrogen atom is replaced by the OH group by means of hydrogen peroxide, a hydroxylamine is formed.

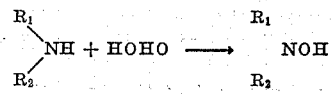

$R_1$ and $R_2$ may be alkyl or aromatic radicals. Hydroxyalkylamines are used as insecticides, parasiticides and fungicides.

If it is replaced by the NO group by means of nitrous acid, we have a nitrosoamine.

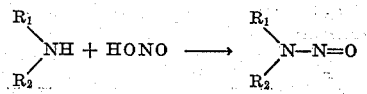

Such amines are used in the manufacture of dyes.

If the hydrogen atom is replaced by the $CS_2$ group we have a dithiocarbamate.

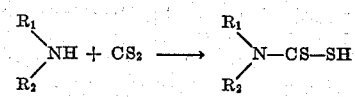

These compounds are used in the rubber industry as accelerators of vulcanization.

Some other uses to which these amines or their derivatives have been put are as follows: the water-proofing of cellulose, cotton, rayon and similar textiles; the rendering of textile products uncrushable; the treatment of textiles in conjunction with formaldehyde; or formaldehyde-producing substances; the dyeing of textiles; the compounding of varnishes and enamels; the preservation of latex; the production of foaming agents, and emulsifying agents; the clarification of water; the sterilization of liquids and as antioxidants.

As stated above, aromatic radicals can replace the alkyl radicals, thus presenting other compounds. For example, secondary aromatic amines such as, phenyl-a-naphthylamine or diphenylnitrosoamine are excellent antioxidants which increase the resistance of rubber to deterioration by heat, light, oxidation and flexing.

Several methods have been suggested for the preparation of unsymmetrical secondary amines but such methods are generally unsuitable for the commercial production of unsymmetrical secondary amines because they result in mixtures of amines which could hardly be separated to produce unsymmetrical secondary amines, and because such methods give poor yields and are too involved and expensive. For example, one of the methods suggested requires secondary amines as a starting material. Other processes give no disclosures as to temperatures and other critical conditions by which commercial production of unsymmetrical secondary amines is made possible.

An object of the present invention is to provide a process which is not subject to the above objections and which produces unsymmetrical secondary amines in commercial volume and by simple and inexpensive steps. A further object is to provide a process in which unsymmetrical secondary amines are prepared from primary amines as the starting material. Yet another object is to provide a process in which unsymmetrical secondary amines, substantially unmixed with other amines, are produced in commercial volume. A still further object is to provide a process in which a primary amine is treated with acrylonitrile or 3-chloropropanenitrile and in which the latter is readily alkylated to a tertiary amine and then pyrolyzed to the secondary amine. Other specific objects and advantages will appear as the specification proceeds.

In one embodiment of the invention, aliphatic unsymmetrical secondary amines are produced with high yield and with the final product which is not contaminated with the primary and tertiary amines. In this embodiment, a cyanoethylalkylamine is prepared by treating a primary amine with either 3-chloropropanenitrile or acrylonitrile.

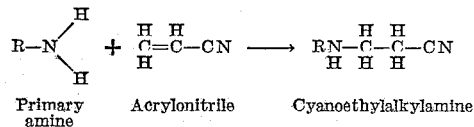

The cyanoethylalkylamine is alkylated by one of several methods; it may be methylated by means of formic acid and formaldehyde; ethylated by means of ethyl chloride; or hydroxyethylated by means of ethylene oxide. When formaldehyde and formic acid are used, the reaction proceeds according to the formula below:

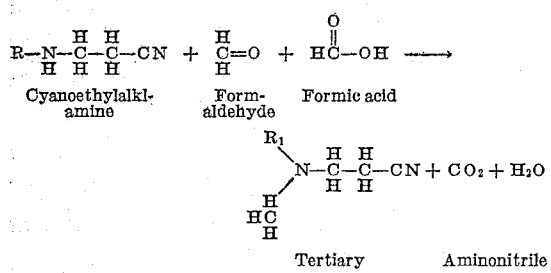

Then the tertiary aminonitrile is subjected to pyrolysis for five to six hours at a temperature of 200°–275° and acrylonitrile is evolved, the residue being an unsymmetrical secondary amine.

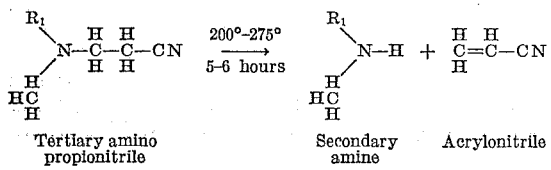

The above embodiment may be set out, by way of illustration, by the following formulae:

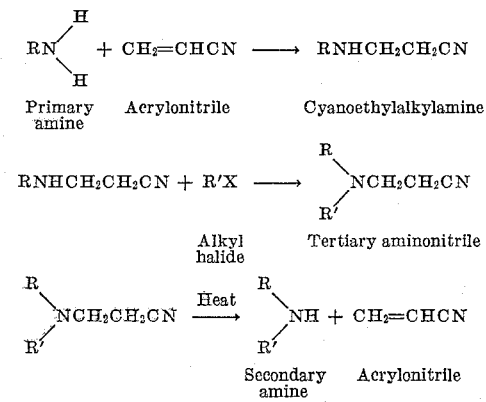

From the above, it will be noted that we employ primary amines as starting materials and that in the later stage we employ an unsymmetrical tertiary amine. The temperatures for pyrolyzing the tertiary amine to produce unsymmetrical secondary amines will vary depending upon the particular starting materials used. We prefer a temperature range of about 200° C. to 275° C. For a maximum conversion, it is desired to employ such temperatures within a preferred time limit of 5 to 6 hours. The time is dependent upon the temperature. By carrying out the above process within the temperature ranges set forth, there is obtained a yield of unsymmetrical secondary amines usually well above 80% and consistently above 60%. Within the temperature range suggested, we prefer the range of 250° C. to 275° C. for a maximum rate of conversion.

In forming the tertiary amine, we prefer 2-cyanoethylalkylamine as the starting material because of the excellent results obtained and also because of the ease with which it is prepared. Furthermore, only acrylonitrile or 3-chloropropanenitrile will react with the nitrogen in the manner described to yield an ethylcyano attachment which may be easily eliminated by pyrolysis following alkylation to the tertiary amine. The reaction of amines with acrylonitrile has long been known to proceed smoothly, but it has not been known that alkylation to a tertiary amine followed by pyrolysis would give excellent yields of unsymmetrical secondary amines.

Depending upon what characteristics will ultimately be desired in the secondary amine, we employ one of a variety of primary amines for reaction with the acrylonitrile. Usually long chain amines of 8–18 carbon atoms of a saturated or unsaturated nature are used to obtain the characteristics peculiar to the fatty compounds from which they are derived, particularly naturally occurring animal, fish and vegetable oils. Examples of such are octyl, decyl, dodecyl, tetradecyl, octadecyl amines, etc. In other words, the preferred primary amines for use in the process of this invention are higher primary aliphatic amines derived from naturally occurring oils, and containing from 8 to 18 carbon atoms in the alkyl or alkylene chain. We may also employ long chain amines in which the carbon chain is interrupted by an oxygen atom to form an ether or in which the carbon chain is interrupted by any other substituting group. Branched carbon chain amines may also be used.

After the above amines are reacted with acrylonitrile to form the cyanoethylalkylamine, we are ready to alkylate. The alkylating agents may be any of the types which yield an alkane radical like methyl, ethyl, propyl or butyl or an alkylol radical such as that derived from ethylene oxide. Radicals of 1 to 4 carbon atoms are most desirable.

As a result of the foregoing process there are produced secondary unsymmetrical amines in which one of the radicals attached to the nitrogen has a carbon chain length of 1 to 4 carbon atoms and the other substituted radical has a chain length of 8 to 18 carbon atoms. As already described, the above amines are produced by heating a corresponding tertiary amino propionitrile to a temperature of about 200°–275° C. for 5 to 6 hours.

Specific examples of the process may be set out as follows:

EXAMPLE 1

*Methyl-dodecylamine*

Fifty grams of methyl-2-cyanoethyldodecylamine prepared by the methylation of 2-cyanoethyldodecylamine with formic acid and formaldehyde were heated at 250° for 5 hours at slightly reduced pressure. A distillate consisting of 34.9 g. was collected. This product had boiling point of 95° C./0.8 mm. and a neutral equivalent of 200. An acetate prepared from the product had a melting point of 53–4° C. All of these constants are identical with those of an authentic sample of methyldodecylamine.

EXAMPLE 2

*Methyl octadecylamine*

A sample (70.8 g.) of methyl-2-cyanoethyloctadecylamine prepared from 2-cyanoethyloctadecylamine by methylation with formic acid and formaldehyde was subjected to pyrolysis at a temperature of 275° for 6 hours at atmospheric pressure. The theoretical quantity of acrylonitrile was collected. Distillation of the product yielded 48 g. (80%) of methyloctadecylamine, boiling point 155° C./0.5 mm.

EXAMPLE 3

*Methyl "tallow" amine*

2-Cyanoethyl "tallow" amine prepared from 200 g. of the amine derived from the fatty acids of tallow was methylated by means of formic acid and formaldehyde. The crude methyl-2-cyanoethyl "tallow" amine was pyrolyzed in the manner described in Example 2. A yield of 167 g. of methyl "tallow" amine was obtained having a boiling range of 145°–175° C. at 1.5 mm.

EXAMPLE 4

*Ethyl-dodecylamine*

Ethyl-2-cyanoethyldodecylamine (25 g.) prepared from 2-cyanoethyldodecylamine and ethyl chloride was pyrolyzed in the manner previously described. A yield of 12 g. of ethyldodecylamine with a boiling point of 114° C./3 mm. was obtained.

EXAMPLE 5

*2-hydroxy-ethyldodecylamine*

2 - Hydroxy - 2' - cyanodiethyl dodecylamine (58.3 g.) prepared by treatment of 2-cyanoethyldodecylamine with ethylene oxide was pyrolyzed in the manner previously described. Distillation of the product yielded 37.9 g. (80%) of 2-hydroxy ethyldodecylamine with a boiling point of 142° C./0.6 mm.

EXAMPLE 6

*Butyl-dodecylamine*

Butyl - 2 - cyanoethyldodecylamine prepared from 2-cyanoethyldodecylamine and butyl bromide, was pyrolyzed at a temperature of 250°–275°. Butyldodecylamine having a boiling point of 120°/1 mm. was obtained.

EXAMPLE 7

*Methyl-octylamine*

Methyl-2-cyanoethyloctylamine (53.9 g.) prepared from 2-cyanoethyloctylamine by methylation with formic acid and formaldehyde was pyrolyzed at 250°. Distillation of the product yielded 23 g. (60%) of methyloctylamine, boiling point 65° C./9 mm.

EXAMPLE 8

*Methyl-octadecylamine*

Methyl-2-cyanoethyloctadecylamine prepared as in Example 2 was pyrolyzed at a temperature of 200° C. at atmospheric pressure. After 12 hours at this temperature 10% of the material was converted to methyloctadecylamine.

While in the foregoing specification, we have set forth certain steps in the process in considerable detail for the purpose of illustrating embodiments of the invention, it will be understood that such details may be varied widely by those skilled in the art without departing from the spirit of our invention.

We claim:

1. In a process for the preparation of unsymmetrical secondary amines, the steps of reacting a higher primary aliphatic amine with a nitrile selected from the group consisting of acrylonitrile and 3-chloropropanenitrile to form a 2-cyanoethylaliphatic amine, treating the 2-cyanoethylaliphatic amine with an alkylating agent to form a tertiary amine, and pyrolizing the tertiary amine to produce unsymmetrical secondary amines.

2. In a process for the preparation of unsymmetrical secondary amines, the steps of reacting a higher primary aliphatic amine containing a chain of from 8 to 18 carbon atoms with a nitrile selected from the group consisting of acrylonitrile and 3-chloropropanenitrile to form a 2-cyanoethylaliphatic amine, treating the 2-cyanoethylaliphatic amine with an alkylating agent providing chains of from 1 to 4 carbon atoms, and pyrolyzing the tertiary amine to produce unsymmetrical secondary amines at a temperature of about 200° C. to 275° C.

3. In a process for the preparation of unsymmetrical secondary amines, the steps of reacting a higher primary alkyl amine containing a chain of from 8 to 18 carbon atoms with a nitrile selected from the group consisting of acrylonitrile and 3-chloropropanenitrile to form a 2-cyanoethylaliphatic amine, treating the 2-cyanoethylaliphatic amine with an alkylating agent to form a tertiary amine, and pyrolizing the tertiary amine to produce unsymmetrical secondary amines.

4. In a process for the preparation of unsymmetrical secondary amines, the steps of reacting a higher primary alkylene amine containing a chain of from 8 to 18 carbon atoms with a nitrile selected from the group consisting of acrylonitrile and 3-chloropropanenitrile to form a 2-cyanoethylaliphatic amine, treating the 2-cyanoethylaliphatic amine with an alkylating agent to form a tertiary amine, and pyrolyzing the tertiary amine to produce unsymmetrical secondary amines.

5. In a process for the preparation of unsymmetrical secondary amines, the steps of reacting a higher primary aliphatic amine with acrylonitrile to form a 2-cyanoethylaliphatic amine, treating the 2-cyanoethylaliphatic amine with an alkylating agent providing alkyl groups containing from 1 to 4 carbon atoms to form a tertiary amine, and pyrolyzing the tertiary amine at a temperature of about 250° C. to 275° C.

6. In a process for the preparation of unsymmetrical secondary amines, the steps of reacting a higher primary aliphatic amine with 3-chloropropanenitrile to form a 2-cyanoethylaliphatic amine, treating the 2-cyanoethylaliphatic amine with an alkylating agent providing alkyl groups containing from 1 to 4 carbon atoms to form a tertiary amine, and pyrolyzing the tertiary amine at a temperature of about 250° C. to 275° C.

7. In a process for forming an unsymmetrical secondary amine, the step of heating a tertiary amino propionitrile, in which one of the aliphatic radicals has from 1 to 4 carbon atoms therein and another of the aliphatic radicals contains from 8 to 18 carbon atoms, to a temperature of 200° C. to 275° C.

8. In a process of forming an unsymmetrical secondary amine, the step of heating a tertiary amino propionitrile, in which one of the aliphatic radicals has from 1 to 4 carbon atoms therein and another of the aliphatic radicals contains from 8 to 18 carbon atoms, to a temperature of 250° C. to 275° C. for 5 to 6 hours.

PAUL L. DU BROW.
JAMES HARWOOD.

REFERENCES CITED

The following references are of record in the file of this patent:

UNITED STATES PATENTS

| Number | Name | Date |
|---|---|---|
| 1,992,615 | Hoffman et al. | Feb. 20, 1935 |
| 2,104,421 | Grun | Jan. 4, 1938 |
| 2,425,693 | Cooke et al. | Aug. 12, 1947 |
| 2,439,359 | Dixon et al. | Apr. 6, 1948 |